(No Model.)
A. P. ALDRIDGE.
DROPPER'S GUIDE FOR CORN PLANTERS.
No. 449,100. Patented Mar. 31, 1891.
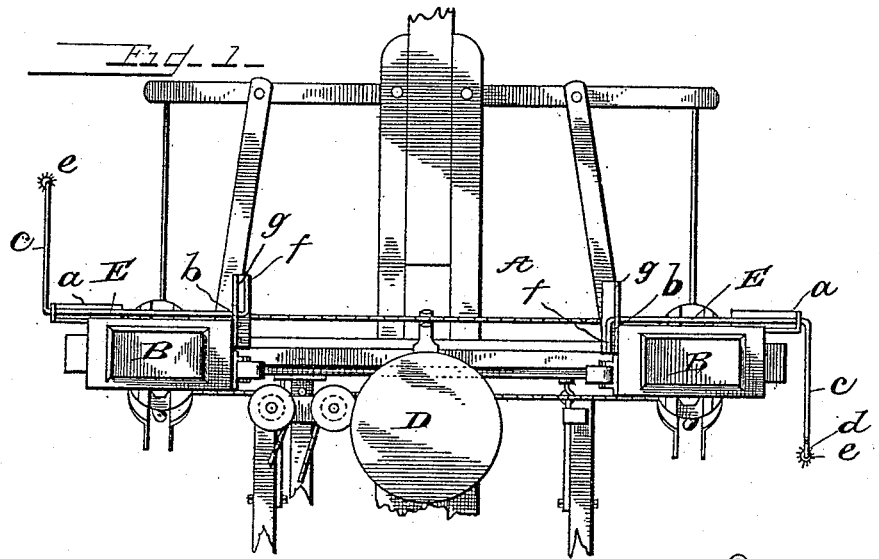
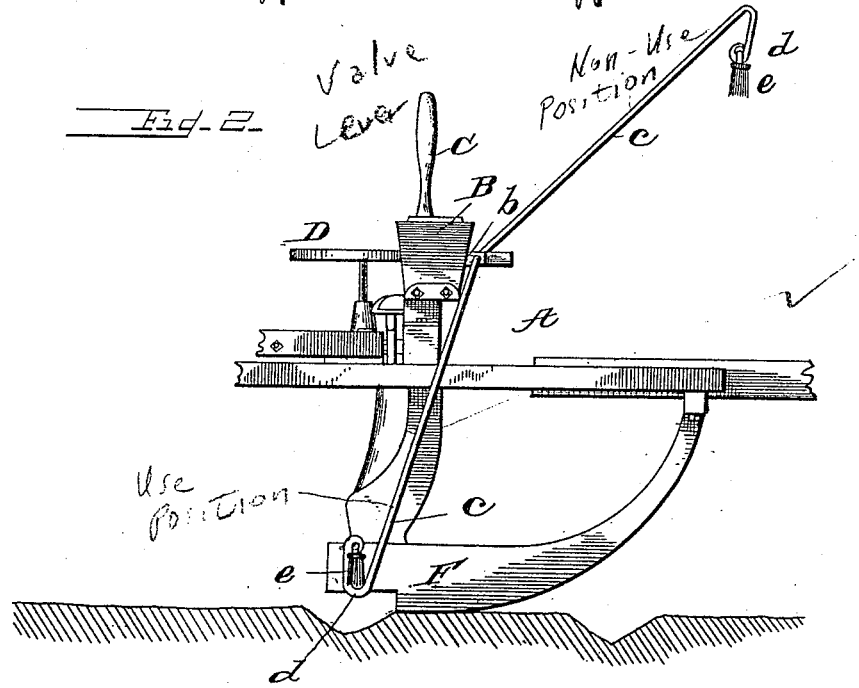
Witnesses  
Inventor

UNITED STATES PATENT OFFICE.

ANDREW PRESTON ALDRIDGE, OF NORTH FORK, VIRGINIA.

DROPPER'S GUIDE FOR CORN-PLANTERS.

SPECIFICATION forming part of Letters Patent No. 449,100, dated March 31, 1891.

Application filed December 6, 1890. Serial No. 373,787. (No model.)

*To all whom it may concern:*

Be it known that I, ANDREW PRESTON ALDRIDGE, a citizen of the United States, residing at North Fork, in the county of Loudoun and State of Virginia, have invented certain new and useful Improvements in Droppers' Guides for Corn-Planters; and I do hereby declare the following to be a full, clear, and exact description of the invention, such as will enable others skilled in the art to which it appertains to make and use the same.

My invention relates to corn-planters, and has for its object the construction of a dropper's guide to be attached to any approved form of corn-planter.

In the construction of the corn-planters in general use the attendant employed to drop the seed is usually required to watch the end of the seed-conductor as it crosses the furrows or marks to enable him to drop the seed in the furrows at regular spaces, which is very essential to facilitate the subsequent working of the corn with a cultivator. To do this the attendant is usually required to sit in a cramped and uncomfortable position, having to look up the furrows and follow them down with his eye to the seed-conductor to enable him to observe the end of the conductor as it crosses each furrow or mark. To do this and in this position the head of the attendant is kept in constant motion, and it frequently occurs that his vision becomes confused by the fatigue and nausea produced by his position, the constant bobbing of his head, and the dazzling effect of the rays of the sun upon the ground. As a result of these conditions, the dropper cannot distinctly observe the crossing of the furrows or marks by the end of the seed-conductor and operate the lever controlling the valve of the hopper at the proper time to drop the seed in the check, and as a consequence the seed is dropped irregularly and the rows of corn grow so irregularly that it becomes very difficult to work the corn both ways with a cultivator. To overcome this difficulty various devices have been constructed for forming a guide for the use of the dropper, and with this object in view I attach a dropper's guide to any approved form of corn-planter in such a position and in such relation to the machine and the attendant that the latter can sit in a comfortable position, avoid moving his head, and yet readily designate the furrows or marks with such regularity that the rows of growing corn will be straight and easily cultivated both ways.

The invention will be hereinafter described, and particularly pointed out in the claims.

In the accompanying drawings, which form part of this specification, Figure 1 represents a plan of the front portion or runner-frame of a corn-planter with my improved dropper's guide attached, and Fig. 2 a side view thereof.

Reference being had to the drawings and the letters thereon, A indicates the front portion or runner-frame, B B the hoppers, C the valve-lever, and D the dropper's seat, of a corn-planter.

Across the front of the machine in any convenient position I secure my improvement, which I have designated as a "dropper's guide," whereby the operator having charge of the dropping of the seed can readily designate each furrow or mark as it is crossed by the guide and drop the seed in the check as the end of the conductor-tube crosses each furrow or mark. The dropper's guide of my construction consists of a rod E, which is secured in suitable brackets, as *a b*, on the sides of the hopper B, or in any suitable position, and is provided at one end with a depending arm *c*, which does not extend to the ground, is in a plane parallel with the runner F, and projects out from the side of the machine such a distance in the line of vision of the dropper as he looks out upon the furrows that he can easily and readily see the end thereof as it crosses the furrows or marks, and thereby indicate to him the proper moment and point at which to draw the lever C and drop the seed into the furrow being crossed by the seed-conductor. The arm *c*, being supported out of contact with the ground over which the planter is passing, prevents the raising of dust by said arm, which would conceal the signal from the attendant.

In the practical operation of my invention I have found that from eighteen to twenty inches is a very convenient distance at which to set the arm *c* from the runner F, and when using my invention the dropper faces the side of the planter and the unplanted furrows, while the driver faces the team drawing the planter. To facilitate the seeing of the end of the depending arm c and relieve the eye of the strain due to intent watching the end of said arm, an upturned end d is provided, which may be supplied with any suitable form of signal e, that may be readily distinguished by the contrast between it and the ground over which the corn-planter is traveling. The opposite end f of the rod E is bent at an angle to the arm c, rests upon the flange g, and supports the guides when in or out of operative position.

The planter shown is provided with two droppers' guides, only one of which, however, is in use at any time, and it is on the side of the machine adjacent to the unplanted ground. When a field has been crossed with one of the guides in use, this guide is thrown up and forward and the guide on the opposite side of the machine turned down for re-crossing the field.

Having thus fully described my invention, what I claim is—

1. A dropper's guide for corn-planters, consisting of a rod projecting from one side of the machine and provided with a depending signal supported out of contact with the ground in a plane parallel with the runner and terminating in the vertical plane of the end of the seed-conductor, substantially as described.

2. A dropper-guide for corn-planters, consisting of a rod crossing the machine, pivotally secured thereon and projecting from one side thereof, and provided with an arm having a signal thereon out of contact with the ground, substantially as described.

3. A dropper's guide for corn-planters, consisting of a rod having a depending arm with a signal thereon out of contact with the ground for designating furrows, and an arm at the opposite end of the rod for supporting the guide, substantially as described.

In testimony whereof I affix my signature in presence of two witnesses.

ANDREW PRESTON ALDRIDGE.

Witnesses:
D. C. REINOHL,
J. W. ALDRIDGE.